Fig. 1.

INVENTOR.
Adolphe Peterson

March 22, 1960 A. C. PETERSON 2,929,207
AXIAL FLOW GAS TURBINE
Filed Aug. 8, 1955 3 Sheets-Sheet 2

INVENTOR.
Adolphe Peterson

United States Patent Office
2,929,207
Patented Mar. 22, 1960

2,929,207

AXIAL FLOW GAS TURBINE

Adolphe C. Peterson, Minneapolis, Minn.

Application August 8, 1955, Serial No. 526,882

12 Claims. (Cl. 60—39.15)

My invention relates to gas turbines and especially to a form of axial flow gas turbine, wherefore it is called axial flow gas turbine.

The principal objects of my invention are to provide a form of axial gas turbine, which will have especial efficiency in use either for jet propulsion of aircraft or other vehicles, or for use in driving of an air propeller means or other means for driving of an aircraft or other vehicle, and which also will have especial efficiency in use for other purposes where it is desired to drive a work shaft of any kind.

An object is to provide such a gas turbine means which, while having an especial efficiency in use of fuel and production of power, will not be over-complicated, and will not be excessively costly to manufacture. Such advantages of efficiency in use of fuel and at the same time, of relatively less costly production of the units for power production, are procured in my device, because of its unique system of operation wherein substantially all the stages of vanes or blades in the turbine are productive of power output, so that there are therefore, no such elements which are mechanically idle and do not thus contribute to work production. The use of this unique system of power production results in greater efficiency in the flow of gases and air through the devices and results also in a need for a lesser number of vane or blade stages in the unit, for the production of a stated power output, or will result in a greater power output for a somewhat similar number of vane or blade stages in comparison with such turbine units of the gas combustion type. Vane or blade stages or units in a gas turbine are costly to manufacture, and also of considerable weight in the devices, and it is an object in this new device, to reduce the requirement of vane or blade stages in the turbine, for a stated power output.

Another object is to provide a form of turbine in which the work elements are associated with certain axial devices, so that there is less difficulty in the manufacture of the turbine casing and parts.

Another object is to provide in connection with this unique form of turbine, a form of air flow for neutralizing leakage or preventing leakage out of the power gas stream, and also for the provision of some cooling for turbine vanes in the turbine, so that accordingly the gas turbine may be more efficient in its production of power.

In general the object is to provide an improved form of gas turbine for power production either for the driving of an air propeller or other work unit, or for the production of a jet means for aircraft or other propulsion, that is, as jet propulsion means.

The principal devices and combinations of devices, forming my invention, are hereinafter described and claimed in the appended claims. In the accompanying drawings which illustrate my invention in two different forms, like characters refer to like parts throughout the views in so far as practicable. Referring to the drawings:

Figures 2 and 3 of the views illustrating the first form shown are drawn to a scale which is approximately two-thirds that of the scale of Figures 1 and 4. The scale of the views of the modified form, Figures 5, 6, 7, is substantially on a like scale as to all three views.

Referring now to the figures, designated as Figures 1, 2, 3, 4 of the first form, this form of my gas turbine means, embodies two so-called gas turbines and compressor units, one of which units is designated generally as A and the other of which is designated generally as B. The unit A has compressor vanes or blades which are in six stages mounted on six rotors 1, 2, 3, 4, 5, 6, respectively, these having blades 7, 8, 9, 10, 11, 12, respectively. The unit A has turbine vanes or blades which are in six stages mounted on six rotors, 13, 14, 15, 16, 17, 18, respectively, these having blades 19, 20, 21, 22, 23, 24, respectively. The compressor rotors 1, 3, 5 and the turbine rotors 13, 15, 17 are each secured rotatively by means of individual key means or other securing means, all designated 25, to one turbine shaft 26 which extends axially through the axial centers of the rotors of compressor and turbine sections, and by this mounting, all the rotors 1, 3, 5, with their compressor blades, and all the rotors 13, 15, 17 with their turbine blades rotate with the turbine shaft 26 as one rotative unit rotating in one direction, all together, and the turbine shaft 26 extends leftwardly (Figure 1) that is forwardly of the unit, and at its extreme forward end this turbine shaft 26 has fixed thereon a bevel gear 27 which is in permanent engagement with a bevel gear 28 on a short transverse shaft 29 and the latter has fixed thereon the small bevel gear 30 which is in permanent engagement with the large bevel gear 31 at one side thereof, the bevel gear 31 being in turn fixed on the rearward end of the short propeller shaft 32. By this arrangement the turbine rotors 13, 15, 17 with their blades are in driving engagement with the compressor rotors 1, 3, 5, and also with the short propeller shaft 32, and the rotors all rotate in a like direction, which may be called a counter-clockwise rotation, looking from leftwardly of Figure 1, and the propeller shaft 32 (a tubular shaft) will rotate in a clockwise direction looking from leftwardly of Figure 1. The tubular shaft 32 rotates within a bearing 32a formed in the structure C and about the leftward end of the shaft 37.

Figure 1:
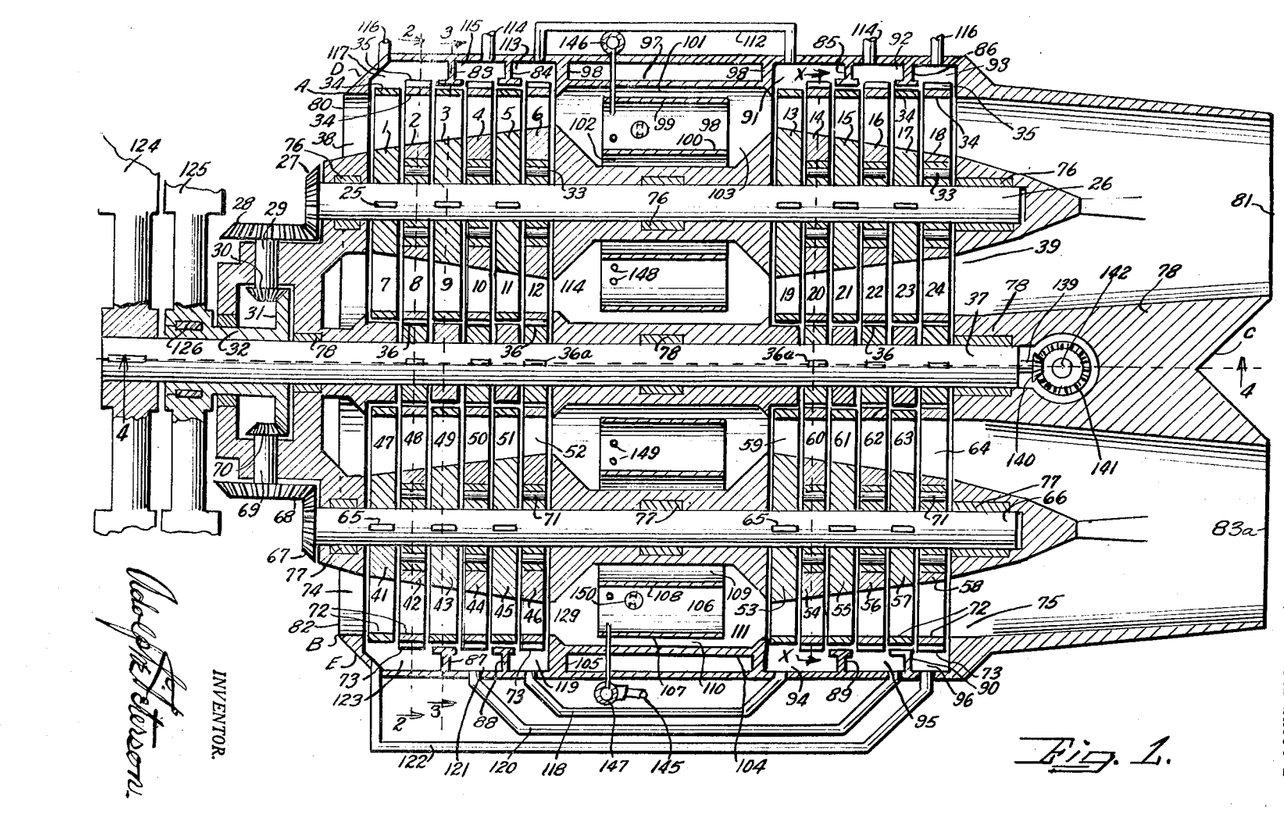
Figure 1 is a view chiefly in horizontal section on a plane passing through the axes of the principal shafts and working elements of the turbine unit, this section being on the lines 1—1 of Figures 2, 3, and 4, some parts being in full plan view, some parts broken away.

The compressor rotors 2, 4, 6, and the turbine rotors 14, 16, 18 are each independently mounted by roller bearing sets or other bearing means, each designated as 33 on the turbine shaft 26 as a bearing for the independent rotation, and in this independent rotation each and all of these rotors, 2, 4, 6, and 14, 16, 18, will rotate in a direction opposite to the rotation of the rotors which are keyed on turbine shaft 26, and that direction will therefore be a clockwise direction rotatively, looking from the leftward end of Figure 1. Each of the rotors designated as independent rotors, namely, 2, 4, 6, 14, 16, 18, have loops on their radially outward periphery, each designated 34, with spur or spiral spur gears thereon, each designated 35, the gears being formed on the peripheral circumference of the hoops, each gear being substantially in the plane of the associated independent rotor and its blades. The hoops 34 may be formed integrally with their attached blades of the rotors or secured thereto in any manner as by welding. The gears 35, preferably spiral spur gears, are each in contact with one associated spur or spiral spur gear 36, of smaller diameter, all of these associated gears 36, six in number, being keyed to a work shaft 37, which latter is mounted rotatively, intermediately of the two units A and B. By this engagement with work shaft 37 through the gears designated, the independent rotors (also called alternate rotors) will all rotate in the clockwise direction as one rotative unit, and they will drive the work shaft 37 in counterclockwise direction, observed leftwardly in Figure 1, and in this operation, the rotation of the rotors in engagement with work shaft 37 will rotate in the direction which is opposite to the direction of rotation of the rotors which are fixed on shaft 26. By this arrangement, compressor rotors 1, 3, 5, rotate in one direction and the compressor rotors intermediately mounted and alternating with them, namely rotors 2, 4, 6, will rotate in the opposite direction, so that rotors do not rotate in the same direction as their immediately adjacent rotors. The blades of each compressor rotor are so formed that they will contribute to air compression by axial flow in the same direction, the individual blades being each formed so that its angle of incidence is such that it is opposite to that of blades of adjacent rotors, and being so formed that its incidence will procure air compression in the same direction of axial flow of the air in the air compression course which is annular in form and which at its mouth is designated 38. The blades of each turbine rotor are so formed that they will contribute to the work driving effort by the flow of gases in axial manner through the unit, in the same axial direction, generally, the individual blades being each formed so that its angle of incidence is such that it is opposite to that of blades of adjacent rotors, and being so formed that its incidence will produce work effort by the same direction of axial flow in the unit, in the gas course, annular in form, and which at its discharge is generally designated 39. That is, the angles of incidence of turbine blades on rotors 13, 15, 17, is opposite to that of the blades on rotors 14, 16, 18. Similarly the angles of incidence of blades on rotors 1, 3, 5, is opposite to that on compressor rotors 2, 4, 6.

Referring now to unit B, this unit has compressor vanes or blades which are in six stages mounted on six rotors 41, 42, 43, 44, 45, 46, respectively, these having blades 47, 48, 49, 50, 51, 52, respectively. The unit B has turbine vanes or blades which are in six stages mounted on six rotors 53, 54, 55, 56, 57, 58, respectively, these having blades 59, 60, 61, 62, 63, 64, respectively. The compressor rotors 41, 43, 45, and the turbine rotors 53, 55, 57, are each secured rotatively by means of individual key means or other securing means, all designated 65, to one turbine shaft 66 which extends axially through the axial centers of the rotors of compressor and turbine sections, and by this mounting, all the rotors 41, 43, 45, with their compressor blades, and all the rotors 53, 55, 57, with their turbine blades rotate with the turbine shaft 66 as one rotative unit rotating in one direction, all together, and the turbine shaft 66 extends leftwardly Figure 1, that is forwardly of the unit, and at its extreme forward end this turbine shaft 66 has fixed thereon a bevel gear 67 which is in permanent engagement with a bevel gear 68 on a short transverse shaft 69 and the latter has fixed thereon the small bevel gear 70 which is in permanent engagement with the large bevel gear 31 at one side thereof (opposite to that of the gear 30), the bevel gear 31 being in turn fixed on the rearward end of the propeller shaft 32, as stated. By this arrangement the turbine rotors 53, 55, 57, with their blades are in driving engagement with the compressor rotors 41, 43, 45, and also with the short propeller shaft 32, and the rotors all rotate in a like direction, which may be called a counter-clockwise rotation, looking from leftwardly of Figure 1, and the propeller shaft 32 will be rotated in the clockwise direction looking from leftward of Figure 1.

The compressor rotors 42, 44, 46, and the turbine rotors 54, 56, 58, are each independently mounted by roller bearing sets or other bearing means, each designated as 71 on the turbine shaft 66 as a bearing for the independent rotation, and in this independent rotation each and all of these rotors, 42, 44, 46, and 54, 56, 58, will rotate in a direction opposite to the rotation of the rotors which are keyed on turbine shaft 66, and that direction will, therefore, be a clockwise direction rotatively, looking from the leftward end of the figure. Each of the rotors designated as independent rotors, namely, 42, 44, 46, 54, 56, 58, have on their radially outward periphery, hoops, each designated as 72, spur or spiral spur gears, each designated 73, the gears being formed on the peripheral circumference of the hoops and therefore also of the independent rotors. The hoops 72 may be formed integrally with their attached blades of the rotors or secured thereto in any manner as by welding. The gears 73, preferably spiral spur gears, are each in engagement with one associated spur or spiral gear 36, which are keyed by key means 36a to work shaft 37, and by this arrangement, the independent rotors 42, 44, 46, and 54, 56, 58, will all rotate in the clockwise direction rotatively, as one rotative unit, and they will drive the work shaft 37 in the counter clockwise direction, observed leftwardly in Figure 1, and in this operation (as in the unit A), the rotation of the rotors in engagement with work shaft 37 will rotate in the direction which is opposite to the direction of rotation of the rotors which are fixed on turbine shaft 66. By this arrangement, compressor rotors 41, 43, 45, rotate in one direction and the compressor rotors intermediately mounted and alternating with them, namely, rotors 42, 44, 46, will rotate in the opposite direction, so that rotors do not rotate in the same direction as their immediately adjacent rotors. The blades of each compressor rotor are so formed that they will contribute to air compression by axial flow in the same direction of the air, the individual blades being each formed so that its angle of incidence is such that it is opposite to that of blades of adjacent rotors, and being so formed that its incidence will procure air compression in the same direction of axial flow of the air in the air compression course which is annular in form and which at its mouth is designated 74. The blades of each turbine rotor are so formed that they will contribute to the work driving effort by the flow of gases in axial manner through the unit B, in the same axial direction, generally, the individual blades being each formed so that its angle of incidence is such that it is opposite to that of blades of adjacent rotors, and being so formed that its incidence will produce work effort by the same direction of axial flow in the unit, in the gas course, annular in form, and which at its discharge is generally designated 75, that is, the angles of incidence of turbine blades on rotors 53, 55, 57, is opposite to that of the blades on rotors 54, 56, 58. Similarly the angles of incidence of blades on rotors 41, 43, 45, is opposite to that on compressor rotors 42, 44, 46.

The turbine shaft 26 is rotatable in bearings 76, forward, intermediate and rear, and the turbine shaft 66 is rotatable in bearings 77, forward, intermediate and rear, and the work shaft 37 is rotatable in bearings 78, forward, intermediate and rear. All the bearings 76, 77, 78, are formed in one bearing fixture generally denoted C, and that bearing fixture supports the entire turbine and propeller means, and may be mounted or secured in any aircraft or other vehicle or base structure by the vertically upwardly extending support posts 79. It is contemplated that in a production of the device, these bearing means and support means may be formed of as many parts, united together by any such means as commonly used for uniting such fixture parts, such as bolts and otherwise.

There are also formed with the bearing fixture unit or firmly secured thereto casings generally denoted D for unit A, and E for unit B, each of these two casings being generally cylindrical in shape, one having the open round air intake or mouth 80 at one end and jet discharge 81 at the other end, and the other having the open round air intake or mouth 82 at one end and the jet discharge 83a at the other or opposite end, and in each unit the air intake and jet discharge are connected by the air compression course and the combustion course and turbine gas course in that succession, as in turbines generally.

The casing D has two annular partitioning walls, one of which is annularly of the compressor rotor 3 and the other is annularly of the compressor rotor 5, but neither of these annular walls is in contact with the rotors so as to restrict movement of the rotor, rotatively, but it is in as close association with or sliding or frictionless contact or association as it can be mechanically constructed, so as not to interfere with rotation of the rotors. This casing D has annular walls, one of which is annularly of the turbine rotor 15, and the other is annularly of the rotor 17, but neither of these walls is in such contact as to hinder rotation of the turbine rotor, but is in such close association, as it may be constructed for the purpose of preventing air flow, as it may be made. The casing E has two annular walls, one of which is annularly of the compressor rotor 43 and the other annularly of rotor 45, but in such close association as not to prevent rotation of the rotors but so as to hinder or obstruct air flow as hereinafter described. The casing E has annular walls, one of which is annularly of the turbine rotor 55 and the other annularly of turbine rotor 57, but neither of these walls is in such contact as to hinder rotation of the turbine rotor, but is in such close association, as it may be constructed for the purpose of preventing air flow, as it may be made. The annular walls, described, of casing D, are designated 83, 84, and 85, 86, respectively, and the annular walls of casing E, are designated in their order, 87, 88, and 89, 90, respectively. These annular walls have the function, as hereinafter more particularly described, of providing upwardly increasing stages of air annularly of the rotors of the compression means, and decreasing stages of air flow annularly of the rotors of the turbine sections, in respect to air pressure.

The air annularly of the turbine rotors in casing D is in three stages or chambers annularly of the turbine rotors, designated respectively, as 91, 92, 93. The air annularly of the turbine rotors in casing E is in three stages or chambers annularly of the turbine rotors, designated respectively, as 94, 95, 96. The air flow in these chambers and its purpose will be hereinafter described.

In casing D, between the compressor means and the turbine means, there is formed an inner annular wall 97 attached by annular perpendicular walls 98, to casing D, and this wall 97 is a casing within which there is an annular combustion chamber 98 formed by two annular walls 99, 100, one within the other, and annular air passages 101 and 102 are formed by such walls, so that, as in turbines, high pressure air may flow from the compressor means in streams, one through the annular combustion chamber 98, and air cooling streams through the annular air passages 101, 102, all these streams uniting in the annular passage 103 which is open to the turbine gas course and drives the turbine blades, and which passage 103 may or may not have nozzle guides such as are used in turbines, and as may be desired in any construction of my device.

In casing E, between the compressor means and the turbine means, there is formed an inner wall 104 attached by annular perpendicular wall 105, to casing E, and this wall 104 is a casing within which there is an annular combustion chamber 106 formed by two annular walls 107, 108, one within the other and formed circumferentially of the axis of the turbine, and annular passages 109, 110, are formed by such walls, so that, as in turbines, high pressure air may flow from the compressor means, associated, in streams, one through the annular combustion chamber 106, and air cooling streams through the annular air passages 109, 110, all these three uniting in the annular passage 111, which latter is open to the turbine gas course and permits gaseous fluid to flow to drive the turbine rotor blades, and which passage 111 may or may not have nozzle guide blades as may be desired in any construction of my device.

The annular chamber 91 is connected by pipe 112 to annular chamber 113 of the compressor means of unit A, and annular chamber 92 is connected by pipe 114 to annular chamber 115 of the compressor means, and annular chamber 93 is connected by pipe 116 to the annular chamber 117 of the compressor means. In unit B, the annular chamber 94 is connected by pipe 118 to annular chamber 119 of the compressor means of that unit, and annular chamber 95 is connected by pipe 120 to annular chamber 121 of the compressor means, and annular chamber 96 is connected by pipe 122 to annular chamber 123 of the compressor means. Thus it results that, in each unit A and B, the highest pressure turbine stages are connected, as to their surrounding chamber to the highest pressure annular chamber about the highest pressure compression stages of the rotor; that the intermediate pressure stages of the turbine are connected, as to their surrounding annular chamber to the intermediate annular chamber about the intermediate compressor stages; and that the lowest pressure stages of the turbine are connected, as to their surrounding annular chamber, to the annular pressure chamber surrounding the lowest or initial stages of the compressor rotor means, so that, there will be about the turbine rotor stages, annular chambers having successively lower pressure stages, since that is the way they are connected. The annular chambers, which have been designated, in this connection, are otherwise closed except that the associated rotors are located within them, and that there may be a proportionately very slight leakage or passage of air under the respective pressures, from the annular chambers peripherally of the associated rotors and through the very thin, as thin as practicable and appropriate, annular spaces between each rotor and its next adjacent rotors. This passage of air in this proportion, will serve two functions, to prevent outward passage of the heated gas streams between the hoops 72 or 34 of rotors, and second, to slightly, in proportion to air passage, cool the said hoops 72 and 34, and thereby strengthen them and increase their resistance to the effect of the high temperature in the turbines. Hoops of all rotors are designated 34 and 72, respectively, in the units A and B.

The work shaft 37 by small extension 139 drives small bevel gear 140, thereby larger bevel gear 141, vertical shaft 142, and the vane or other rotor of fuel pump 143 (rotor not shown) and pump means 143 delivers fuel to pipe 145 and receives fuel from supply pipe 144, and pipe 145 delivers to common fuel conduits 146 and 147, which conduits are nearly completely annularly about the casings D and E, to pass fuel to nozzles 148, 149, to the combustion chambers of units A and B. The flow of fuel must be substantially equal to units A and B and equal in all nozzles, any means as commonly known being used to procure that end. Each combustion chamber has spark plugs 150 for ignition. The work shaft 37 has fixed on its extreme forward end the air propeller means 124, and tubular shaft 32 has fixed at its forward end (but behind propeller 124) the air propeller 125.

Figure 2:
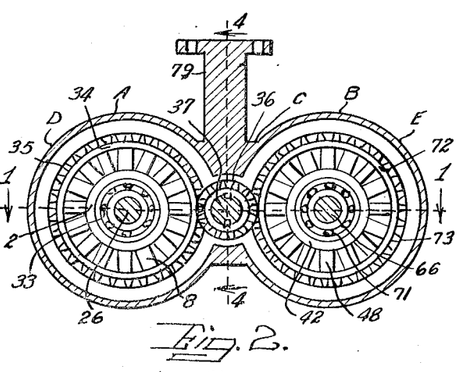
Figure 2 is a section transversely of the principal working elements of the unit and at right angles to the plane of Figure 1, this section being on the lines 2—2 of Figures 1 and 4, there being shown in side elevation, one of the vane stage means.
Figure 3:
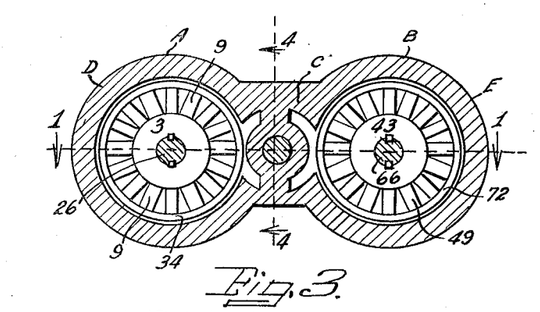
Figure 3 is a section transversely of the principal working elements of the unit and at right angles to the plane of Figure 1, this section being on the lines 3—3 of Figures 1 and 4, there being shown in side elevation, one of the vane stages or means which is of the so-called alternate form.
Figure 4:
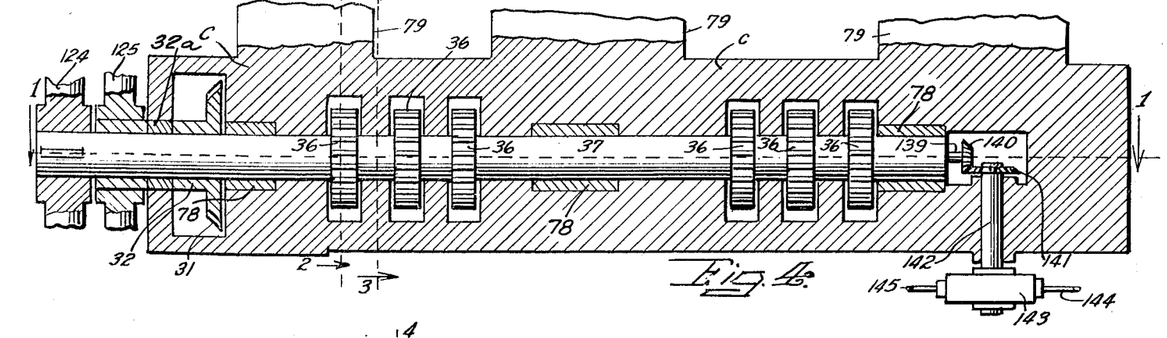
Figure 4 is a section vertically of the plane of Figure 1, this section being on the line 4—4 of Figures 1, 2, 3, and being a section through the axis of a so-called intermediate shaft or transmission shaft, some parts being broken away, some parts being shown in full side elevation.

A section through the turbines, on a plane at right angles to that of Figure 1, is not shown in the drawings, since it will appear in Figure 1, that the construction, in so far as relates to the independent operation of the independent rotors, is like that of the compressor rotors. Therefore a section on the line x—x of Figure 1, would be substantially similar to the section of compressor rotors, as shown in Figure 2, with respect to roller bearing mounting, and the relation of the toothed gears externally of the external hoops of the rotors to the intermediately inter-engaged spur or spiral spur gear 36. Likewise a section transversely through the rotors of the turbine which are fixed on the shafts 26 and 66 would be substantially similar to the section through compressor rotors, as shown in Figure 3. In either case the blades of rotors would be different from blades of the compressor rotors. In the case of either rotors, the blades would have that construction, as to form, which is commonly found in turbines and compressors and each type would be constructed or formed in such a way as to procure the utmost of efficiency in the operation.

Having specifically described the construction, the general operation is now briefly described. Any starting means such as commonly employed with turbines, may be incorporated with the device or used with the device, and such means is not therefore shown. Such starting means may be any such means as are used on airplanes to start turbines. Assuming the shafts 26 and 66 are started in rotation, in their proper direction, the fuel pump means 143 will pump fuel from any source of supply (not shown) and will discharge this fuel under a sufficiently high pressure to the common fuel lines 146—147, and fuel will flow in equal quantities from all fuel nozzles 148 and 149, and this fuel will be sprayed into air passing through the combustion chambers 98 and 106. Concurrently air will be drawn from the atmosphere into the compression courses by intake mouths 80, 82, and this air will be successively compressed to higher pressures by the compressor rotors 1, 2, 3, 4, 5, 6 of unit A, and 41, 42, 43, 44, 45, 46 of unit B and passed under a pressure which may be as much as eighty to 100 pounds and the greater part of this compressed air will flow in streams to combustion chambers 98, 106, and cooling streams will flow through spaces 102, 101, and 109 and 110, and combustion will occur in the combustion chambers and air streams and combustion gases will unite in annular discharge passages 103 and 111, and the gases and air will flow to the turbine gas courses, and successively pass the blades of turbine rotors 13, 14, 15, 16, 17, 18 (in unit A) and will successively pass the blades of turbine rotors 53, 54, 55, 56, 57, 58 in the unit B, and in each turbine the gases will drive the rotors by their velocity and impact on the blades, and the gases will discharge through discharge jets 81, 83a.

In the flow of air and gases through compressors and turbines, the rotors fixed on shafts 26 and 66 will rotate in direction opposite to the direction of rotation of the independent rotors which are rotatable independently of the shafts 26 and 66, and this rotation is in cooperation with the intermediate shaft, work shaft, 37, through the cooperation of the gears 36 with the gear means 35 and 73. Thus, the turbine rotors fixed on shafts 26 and 66 will all impart driving torque to those shafts and through them to the compressor rotors fixed on those shafts, and work will be imparted also to the tubular propeller shaft 32, to drive the air propeller 125 which is fixed by key means 126 on shaft 32. Thus, also, the turbine rotors, independently rotating, will by their gears 35, 73 drive the gears 36, in inter-engagement, and the shaft 37, will drive the independently rotatable compressor rotors 2, 4, 6, and 42, 44, 46, by the gears 36 engaged with gears 35, 73, of the rotors, and will also drive the air propeller 124.

In the movement of air and gaseous fluids through the units, the oppositely rotating rotors, will because of their opposite angles of incidence of the blades, each and every one of them, exert either a compressing force or have propulsion force exerted on it and them. Compressor blades will all exert compressing force and turbine blades will all have propulsion force exerted on them as in turbines.

In the compression of air successively by the compressor rotors, the air is successively at higher pressures, and therefore the air in annular chambers 117, 115, 113, will be at successively higher pressures, and that in chambers 123, 121, and 119, will be at successively higher pressures. Thus some air at successively higher pressures will flow in the respective conduits 116, 114, 112, and likewise in conduits 122, 120, 118, and therefore air in annular chambers 91, 92, 93, of the A unit, and in chambers 94, 95, 96, of the B unit, will in the case of each unit, be at sucessively lower pressures. The air in chambers 91, 92, 93 of the A unit, and in chambers 94, 95, 96, of the B unit, will be at pressures, which, in the case of each chamber, is at a pressure which is just slightly above the pressure prevailing in the turbine gas courses, in the spaces adjacent the blades or rotors which are radially internally of each particular chamber, so that there will always, in normal operation, be a slight differential of pressure, which may be only a few pounds, or even less, and this low differential of pressure, will cause a slight flow of the air radially inwardly between the adjacent rotors, to the gas courses within the hoops 34 or 72, and this slight flow of air will serve to somewhat cool the hoops 34, 72, and will mix with gases in the gas courses, and this flow will also prevent any flow radially outwardly from the gas courses, to the annular chambers 91, 92, 93, or 94, 95, 96. Prevention of this radially outward flow will serve to prevent too great heating of the toothed gears and also to permit slight lubrication of adjacent surfaces of hoops 34, and 72, and also the gears, and will also permit of a construction, such that there is not any excessive friction of hoop parts of hoops 34, 72, and will also permit of a less expensive construction, by eliminating the need for excessively great precision in manufacture.

The hoops 34, 72 of all rotors, should be so constructed, that adjacent hoops are as close together as is practicably possible, with efficient and reliable operation, and ease of maintenance, and so that the space between hoops is as small as is practicably possible, so that the proportion of air flowing radially inwardly, is as small as is practicable. Use of this flow of air, will permit of use of a lesser proportion of air in channels 102, 101, and the corresponding channels 109, 110 of unit B.

Figures 5, 6, 7:
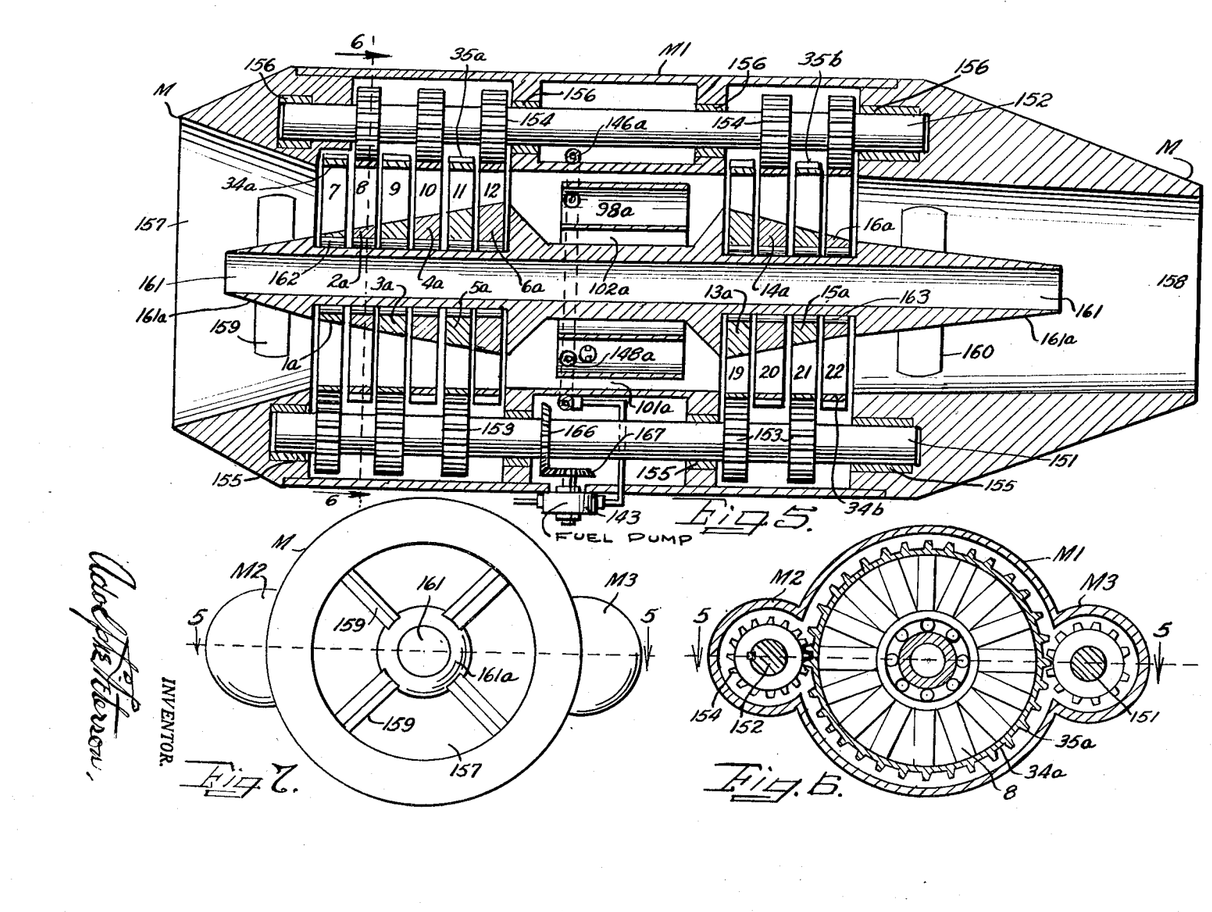
Figure 5 is a section horizontally through the axes of the working shafts and working elements, of an alternative or modified form of my device, this section being on the lines 5—5 of Figures 6 and 7, some parts being in full plan view, notably shafts 151, 152, and their gears 153, 154.
Figure 6 is a section at right angles to the plane of Figure 5, this section being on the line 6—6 of Figure 5, one of the stages of vanes being shown in side elevation. Sections through the other stages would be substantially similar and are, therefore, not shown, but it should be noted that, looking from the same direction, from the left of Figure 5, the transmission means would be observed as substantially reversed, as to the alternative or opposite flow vane stages.
Figure 7 is a view in front elevation of the device shown in Figures 5 and 6, that is looking from the left of Figure 5.
Figure 8:
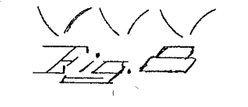
Figures 8 and 9 diagrammatically show opposite incidence of compressor and turbine blades, respectively.
Figure 9:
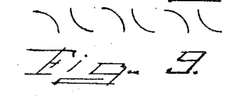

Referring now to the modified form of my device, which is shown in Figures 5, 6, 7, the modified form shown, differs from the first form shown chiefly, in two particulars, first that in this form only one compressor-turbine unit is shown, and second, there is a modified driving shaft arrangement in this form. There is in this form, no axially located driving or inter-engaging shaft, but instead, there are two inter-engaging shafts, each of which is located adjacent and externally of the periphery of the compressor and turbine rotors. These two shafts are designated, 151 and 152, respectively, and one is diametrically on one side and the other diametrically on the opposite side, of the plane passing through the axial center of the unit, and each said shaft is parallel to that axial center, and each is parallel to the other, and both are located in the same plane through the axial center of the unit. The shaft 151 has spur or spiral spur gears 153 fixed thereon and the other has spur or spiral spur gears 154 fixed thereon.

The gears 153 are engaged, three each with one compressor rotor 1a, 3a, 5a, and two each with one turbine rotor 13a, 15a. The gears 154 are engaged, three each with one compressor rotor 2a, 4a, 6a, and two each with one turbine rotor 14a, 16a. All compressor rotors are located successively one after the other with no intervening stator blades or obstructions between blades, and there are thus six compressor rotors in succession, axially of the device, and in this succession, the compressor rotors engaged by the gears with one shaft are alternated with the compressor rotors engaged by the gears with the other shaft. All the four turbine rotors are located successively one after the other with no intervening stator blades or other obstructions, between blades, and there are thus four turbine rotors in succession, and in this succession, the turbine rotors engaged by the gears with one shaft are alternated with the turbine rotors engaged by the gears with the other shaft. Two of the turbine rotors thus are actually engaged with three of the compressor rotors and the other two of the turbine rotors thus are actually engaged with the other three of the compressor rotors, and thus two turbine rotors will drive three compressors rotors and the other two turbine rotors will drive the other three compressor rotors. All compressor and turbine rotors have gears 35a, 35b, respectively.

The shafts 151 and 152 are each rotatably mounted in bearings, 155 for one shaft and 156 for the other shaft and bearings for one shaft are located on one side of the unit and bearings for the other are located on the other side of the unit, all bearings being formed in the casing structure which is generally designated as M and which has the large central cylindrical structure M1 and the two partially cylindrical structures M2 and M3, which house the shafts and gears, one such structure being at one side of the unit and the other at the other side of the unit. These casing structures also form a casing about the rotors, so that they are housed radially internally of the casing structure M1, and so that the rotors are disposed successively, in the axial center of the structure M1.

The casing structure has the open forward air intake or mouth 157, and the rearward gas discharge jet 158 and the casing structures together with the hoops 34a of the compressor rotors and the hoops 34b of the turbine rotors, form a cylindrical fluid course, within the casing structure, and which has near its forward end the air compressing course and has nearer its rearward end the turbine gas course, and has intermediately the combustion area, within which is the annular combustion chamber 98a, and the air cooling annular courses 102a and 101a.

The casing structure M has fixed internally within it and axially of the structure, supported by ribs 159 and 160, and other ribs as may be necessary, a static so-called axle bearing, which is tubular in form, having the long, open ended, tubular passage 161 within it, and which is strong and firm, and which forms a rigid bearing for rollers 162 and 163, mounted directly on it (or by inner rings if desired) and indirectly by means of the rollers, for the compressor rotors and the turbine rotors, which are mounted thereon, compressor rotors in succession, and turbine rotors in succession, by means of their internal hub-like structures or hubs each, rotatable independently. The blades of the compressor rotors engaged with one shaft 151 are of one angle of incidence and those of the compressor rotors engaged with the other shaft 152, are of the opposite angle of incidence and rotors engaged with one shaft have a rotation opposite to those engaged with the other shaft. Likewise the blades of the turbine rotors engaged with one shaft are of one angle of incidence and those of the rotors engaged with the other shaft, are of the opposite angle of incidence, so that accordingly, the rotors, both of compressor means and turbine means, are bladed for opposite rotation, and each for performing its work by its opposite rotation, to adjacent rotors, as in the first form described. One shaft has a bevel gear 166 fixed thereon which through bevel gear 167 drives the fuel pump 143, which as in the first form supplies fuel through annular conduit or common fuel line 146a to fuel nozzles 148a.

It will be seen in Figure 5, that all air entering the air intake 157 divides into two parts, the large major part entering the air compressing course which is annularly in the structure, and a small part or stream entering the tubular passage 161. The first stream is the air which is compressed and forms combustion air and produces the gas pressure fluid for driving the turbine rotors, and the second forms a cooling stream which passes internally of the axle bearing member 161a and discharges at the rearward end of the passage 161 and there unites with combustion gases discharging from the turbine means, the two united streams discharging through the jet discharge 158, to atmosphere. Any lubrication means for the bearing means, may be passed, as lubrication means are generally formed, into the axle bearing structure and other structure to provide lubrication. The gears, on all rotors, are formed externally of the hoops of the rotors, as in the first form. Any such means, as in the first form, for successive graduating stages of air pressure, externally of the rotors, may be provided, if desired, this means being not shown in this form, for simplicity in the drawings. The rotors may be located so closely adjacent each other, that there is no flow of any consequence radially outwardly between the external hoops of the rotors.

This second form is shown as, forming a propulsion means, for jet propulsion, as in jet propulsion means, as commonly known, but it is contemplated that this form, may be constructed to have any driving connection between its shafts, and any air propeller means or other driven means, as in the first form described. The provision of the oppositely rotating rotors, both of compressing means and turbine driving means, in this form, as in the first, will provide efficient compression and induction of air and efficient turbine driving for the air stream means. In either form, the roller bearing means may be omitted and the usual plan surface bearing means, well lubricated, may instead be used. I have shown air propeller means in connection with the first form, but that is not to exclude from use, any form of ducted fan or air by-pass means, which may be used with this device, as with any turbine driving means, and I contemplate that this turbine means is applicable to the driving of any type of propulsion means or is applicable to the driving of any type of industrial machinery or otherwise, for power production and its use.

The principal devices and combinations of devices, comprising my invention, may be otherwise formed, and

What I claim is:

1. In a combustion gas turbine: a primary compressor rotor means and a primary turbine rotor means and a primary rotative shaft operatively connecting the primary compressor rotor means and the primary turbine rotor means; a secondary compressor rotor means and a secondary turbine rotor means and a secondary rotative shaft operatively connecting the secondary compressor rotor means and the secondary turbine rotor means; each of said compressor rotor means having blades annularly therein, the said primary compressor rotor means having its blades arranged with opposite incidence to those of the secondary compressor rotor means and so blades of one angle of incidence are in sequence with blades of the opposite angle of incidence; each of said turbine rotor means having blades annularly therein, the said primary turbine rotor means having its blades arranged with opposite incidence to those of the secondary turbine rotor means and so blades of one angle of incidence are in sequence with blades of the opposite angle of incidence; a combustion chamber means having a fuel supply therein; an air intake means and a gas discharge means; the said compressor rotor means arranged with said air intake means to provide air flow axially parallel through said compressor rotor means to be compressed successively by the blades thereof; the said turbine rotor means arranged with said gas discharge to provide generally axially parallel flow through said turbine rotor means to drive said turbine rotor means; the said combustion chamber means forming connection between said compressor rotor means and said turbine rotor means for flow of air under compression to said combustion chamber means for combustion with fuel and for flow of gaseous heated products to said turbine rotor means; each said rotative shaft being rotatively mounted in relatively static bearing means, the said rotative shafts having their axes parallel each to the other; at least one of said compressor rotor means having shroud means secured annularly of the blades and to their tips with toothed gear means formed peripherally of the shroud means; at least one of said turbine rotor means having shroud means secured annularly of the blades and to their tips with toothed gear means formed peripherally of the shroud means; at least one of said rotative shafts having a toothed gear means secured therewith and engaged radially externally of the toothed gear means of the shrouded compressor rotor means, and having also a toothed gear means secured therewith and engaged radially externally of the toothed gear means of the shrouded turbine rotor means each said turbine rotor means having a plural number of turbine rotors each with blades annularly therein; the said turbine rotor means having annularly thereof an enclosing casing radially externally of the rotor means and forming substantially separated annular compartments, an associated member or members of the turbine rotor means being radially internally of each of said compartments; each of said compartments externally of the turbine rotor means having conductive connection with an associated pressure stage of the air compressing course of the compressor rotor means to receive air under pressure therefrom; the conductive connections having such an arrangement that successive compartments annularly of the turbine rotor means of successively lower fluid driving pressure on their blades are in conductive connection with successively lower pressure stages of the air compressing course of the compressor rotor means.

2. A pair of combustion gas turbine units, each comprising: a primary compressor rotor means and a primary turbine rotor means and a primary rotative shaft axially of the said rotor means and operatively connecting the primary compressor rotor means and the primary turbine rotor means; a secondary compressor rotor means and a secondary turbine rotor means; each of said compressor rotor means having blades annularly therein, the said primary compressor rotor means having its blades arranged with opposite incidence to those of the secondary compressor rotor means and so blades of one angle of incidence are in sequence with blades of the opposite angle of incidence; each of said turbine rotor means having blades annularly therein, the said primary turbine rotor means having its blades arranged with opposite incidence to those of the secondary turbine rotor means and so blades of one angle of incidence are in sequence with blades of the opposite angle of incidence; a combustion chamber means having a fuel supply thereto; an air intake and a gas discharge; all the said compressor rotor means arranged with said air intake to provide air flow generally axially parallel through all of said compressor rotor means to be compressed successively by the blades thereof; all the said turbine rotor means arranged with said gas discharge to provide generally axially parallel flow through all of said turbine rotor means to drive said turbine rotor means; the said combustion chamber means forming connection between said compressor rotor means and said turbine rotor means for flow of air under compression to said combustion chamber means for combustion with fuel and for flow of gaseous heated products to said turbine rotor means; each of said secondary compressor rotor means and each of said secondary turbine rotor means of the air of defined gas turbine units having a shroud means peripherally thereof and fixed to the tips of the associated blades and having toothed gear means formed peripherally of the shroud means and in combination a secondary rotative shaft having bearing mounting for its rotation on an axis parallel to said primary rotative shafts of the two combustion gas turbine units and intermediately of said two combustion gas turbine units, the said secondary rotative shaft having toothed gear means fixed thereon and in interengagement with the said toothed gear means of all of said secondary compressor rotor means and said secondary turbine rotor means of each of the said pair of combustion gas turbine units.

3. In a combustion gas turbine means; a primary compressor rotor means and a primary turbine rotor means and a primary rotative shaft operatively connecting the primary compressor rotor means and the primary turbine rotor means; a secondary compressor rotor means and a secondary turbine rotor means and a secondary rotative shaft operatively connecting the secondary compressor rotor means and the secondary turbine rotor means; the said primary compressor rotor means having its blades arranged with opposite incidence to those of the secondary compressor rotor means and so blades of one angle of incidence are in sequence with blades of the opposite angle of incidence; each of said turbine rotor means having blades annularly therein, the said primary turbine rotor means having its blades arranged with opposite incidence to those of the secondary turbine rotor means and so blades of one angle of incidence are in sequence with blades of the opposite angle of incidence; a combustion chamber means having a fuel supply thereto; an air intake and a gas discharge; all the said compressor rotor means arranged with said air intake to provide generally axially parallel flow through all of said compressor rotor means to be compressed successively by the blades thereof; all the said turbine rotor means arranged with said gas discharge to provide generally axially parallel flow through all of said turbine rotor means to drive said turbine rotor means; the said combustion chamber means forming connection between said compressor rotor means and the said turbine rotor means for flow of air under compression to said combustion chamber means for combustion with fuel and for flow of gaseous heated products to said turbine rotor means; the said rotatable shafts having their axes parallel each to the other; the compressor rotor means and the turbine rotor means associated with one of said rotative shafts having each peripherally mounted shroud means secured to blade tips annularly thereof and having formed peripherally thereof and in the plane of the blades of the rotor, toothed gear means peripherally of and fixed on the shroud means, this said rotative shaft having its axis adjacent to and spaced radially from the external peripheries of its interconnected compressor rotor means and turbine rotor means and having geared elements rotative therewith and each in geared connection with a peripherally mounted gear of one of the associated rotor means; the compressor rotor means and the turbine rotor means associated with the other of said rotative shafts having each peripherally mounted shroud means secured to blade tips annularly and peripherally thereof and having formed peripherally of the shroud means and in the plane of the blades of the rotor toothed gear means peripherally of and fixed on the shroud means, this said rotative shaft having its axis adjacent to and spaced radially from the external peripheries of its interconnected compressor rotator means and turbine means and having geared elements rotative therewith and each in geared connection with a peripherally mounted gear of one of the associated rotor means.

4. In axial flow annularly bladed rotor means: a primary rotor means comprised of a plural number of rotor elements, and a secondary rotor means comprised of a plural number of rotor elements; all elements of said primary and secondary rotor means having rotatable bearing mounting on a common axial bearing element; each rotor element having blades formed annularly therein, the blades of rotor elements of the primary rotor means being arranged with opposite incidence to that of blades of rotor elements of the secondary rotor means, all of the said rotor elements arranged to provide for fluid flow generally parallel with the axis of rotation; a primary rotative shaft mounted in bearing means to be rotative on an axis parallel to the axis of all said rotative elements and spaced radially outwardly from said rotor elements, and having a plural number of gear elements one for each rotor element of the primary rotor means; a secondary rotative shaft mounted in bearing means to be rotative on an axis parallel to the axis of all said rotor elements and spaced radially outwardly from said rotor elements, and having a plural number of gear elements one for each rotor element of the primary rotor means; each of said rotor elements of said primary rotor means and said secondary rotor means having circumferentially of the blades thereof a shroud and having circumferentially of the shroud and in the plane of the blades of the rotor a shroud gear; each shroud gear of the primary rotor means being in engagement with one gear element of the primary rotor shaft; each shroud gear of the secondary rotor means being in engagement with a gear element of the secondary rotative shaft.

5. In turbine means: a primary compressor rotor means comprised of a plural number of rotor elements, and a secondary compressor rotor means comprised of a plural number of rotor elements; a primary turbine rotor means and a secondary turbine rotor means; all rotor elements of the primary compressor rotor means and the secondary compressor rotor means and said primary turbine rotor means and said secondary turbine rotor means having rotatable bearing mounting on a common axial bearing element; each compressor rotor element and each of said primary and secondary turbine rotor means having blades formed annularly therein, the blades of rotor elements of the primary compressor rotor means being arranged with incidence opposite to that of blades of rotor elements of the secondary compressor rotor means; the blades of the primary turbine rotor means being arranged with incidence opposite to that of blades of the secondary turbine rotor means; a combustion chamber means between the compressor rotor means and the turbine rotor means; an air intake and a gas discharge; all of said rotor elements of each of the compressor rotor means being arranged to provide flow from said air intake, through said combustion chamber means, through said primary and secondary turbine rotor means, to said gas discharge, the flow being generally axially parallel with the axis of rotation; a primary rotative shaft mounted in bearing means to be rotative on an axis parallel to the axis of all of said compressor rotor elements and said primary and secondary turbine rotor means, and spaced radially outwardly from said rotor elements and said primary and secondary turbine rotor means, and having a plural number of gear elements one for each rotor element of the primary compressor rotor means and gear means also for the primary turbine rotor means; a secondary rotative shaft mounted in bearing means to be rotative on an axis parallel to the axis of all said compressor rotor elements and said primary and secondary turbine rotor means, and spaced radially outwardly from said rotor elements and said primary and secondary turbine rotor means, and having a plural number of gear elements one for each rotor element of the secondary compressor rotor means and gear means also for the secondary turbine rotor means; each of said rotor elements of said primary compressor rotor means and said secondary compressor rotor means having circumferentially of the blades thereof a shroud and having circumferentially of the shroud and in the plane of the blades of the rotor a shroud gear; each of said primary and secondary turbine rotor means having circumferentially of the rotor means a shroud means and having circumferentially of the shroud means and in the plane of the blades of the rotor means a shroud gear means; each shroud gear of the primary compressor rotor means being in engagement with one gear element of the primary rotative shaft; each shroud gear of the secondary compressor rotor means being in engagement with one gear element of the secondary rotative shaft; the shroud gear means of the primary turbine rotor means being in engagement with the gear means of the primary rotative shaft; the shroud gear means of the secondary turbine rotor means being in engagement with the gear means of the secondary rotative shaft.

6. In a combustion gas turbine: a primary compressor rotor means and a primary turbine rotor means and a primary rotative shaft operatively connecting the primary compressor rotor means and the primary turbine rotor means; a secondary compressor rotor means and a secondary turbine rotor means and a secondary rotative shaft operatively connecting the secondary compressor rotor means and the secondary turbine rotor means; each of said compressor rotor means having blades annularly therein, the said primary compressor rotor means having its blades arranged with opposite incidence to those of the secondary compressor rotor means and so blades of one angle of incidence are in sequence with blades of the opposite angle of incidence; each of said turbine rotor means having blades annularly therein, the said primary turbine rotor means having its blades arranged with opposite incidence to those of the secondary turbine rotor means and so blades of one angle of incidence are in sequence with blades of the opposite angle of incidence; a combustion chamber means having a fuel supply thereto; an air intake means and a gas discharge means; the said compressor rotor means arranged with said air intake means to provide air flow generally axially parallel through said compressor rotor means to be compressed successively by the blades thereof; the said turbine rotor means arranged with said gas discharge to provide generally axially parallel flow through said turbine rotor means to drive said turbine rotor means; the said combustion chamber means forming connection between said compressor rotor means and said turbine rotor means for flow of air under compression to said combustion chamber means for combustion with fuel and for flow of gaseous heated products to said turbine rotor means; each said rotative shaft being rotatably mounted in relatively static bearing means, the said rotative shafts having their axes parallel each to the other; at least one of said compressor rotor means having shroud means secured annularly of the blades and to their tips with toothed gear means formed peripherally of the shroud means and in the plane of the blades; at least one of said turbine rotor means having shroud means secured annularly of the blades and to their tips with toothed gear means formed peripherally of the shroud means and in the plane of the blades; at least one of said rotative shafts having a toothed gear means secured therewith and engaged radially externally of the toothed gear means of the shrouded compressor rotor means, and having also a toothed gear means secured therewith and engaged radially externally of the toothed gear means of the shrouded turbine rotor means.

7. In a combustion gas turbine: a casing structure including a compressor casing and a turbine casing and primary bearing means and secondary bearing means formed with the casing structure; a primary rotative shaft being mounted in said primary bearing means and having in driving connection therewith a primary compressor rotor and a primary turbine rotor; the said primary compressor rotor having compressor blades annularly and peripherally of the rotor, a shroud affixed annularly and peripherally of the blades, a gear affixed annularly and peripherally of the shroud and in the plane of the blades; the said primary turbine rotor having turbine blades annularly and peripherally of the rotor, a shroud affixed annularly and peripherally of the turbine blades, a gear affixed annularly and peripherally of the shroud and in the plane of the turbine blades; the said primary rotative shaft having its axis of rotation parallel to the axis of the primary compressor rotor and the primary turbine rotor and located radially away from the gears mounted on said rotors, and having fixed thereon a pair of gears one engaged with the gear on the primary compressor rotor and one engaged with the gear on the primary turbine rotor; a secondary rotative shaft being mounted in said secondary bearing means and having in driving connection therewith a secondary compressor rotor and a secondary turbine rotor; the secondary compressor rotor having compressor blades annularly and peripherally thereof; the secondary turbine rotor having blades annularly and peripherally thereof; the said secondary rotative shaft having driving engagement with said secondary compressor rotor and secondary turbine rotor and having its axis of rotation parallel to the axis of rotation of said primary rotative shaft; the said primary and secondary compressor rotors having bearing mounting in said structure to be rotative in said compressor casing in axial alignment rotatively and to provide for flow of air therethrough generally parallel to the axes of rotation; the said primary and secondary turbine rotors having bearing mounting in said structure to be in axial alignment rotatively and to provide for flow of gases therethrough generally axially parallel to their axes of rotation; an air intake to the compressor rotors, a discharge from the turbine rotors, a combustion chamber means between the compressor rotors and the turbine rotors, and means discharging fuel to the combustion chamber means; the blades of the primary and secondary compressor rotors being of opposite angles of incidence to the air stream, the blades of the primary and secondary turbine rotors being of opposite angles of incidence to the flow of combustion gases.

8. In a combustion gas turbine: a casing structure including a compressor casing and a turbine casing and a primary bearing means and a secondary bearing means formed with the casing structure; a primary rotative shaft mounted in said primary bearing means; a plural number of primary compressor rotors and a primary turbine rotor; each said primary compressor rotor having compressor blades annularly and peripherally thereof; a shroud affixed annularly and peripherally of the blades, a gear affixed annularly and peripherally of the shroud and in the plane of the blades of the rotor; the said primary turbine rotor having turbine blades annularly of the rotor, a shroud affixed annularly and peripherally of the turbine blades, a gear affixed annularly and peripherally of the shroud and in the plane of the blades of the rotor; the said primary rotative shaft having its axis of rotation parallel to the axis of rotation of the primary compressor rotors and primary turbine rotor and located radially away from the peripheries of the gears mounted on the rotors and having fixed thereon a plural number of gears one of which gears is in engagement with a gear of each compressor rotor and one of which is in engagement with the gear of the primary turbine rotor; a secondary rotative shaft mounted in said secondary bearing means; a plural number of secondary compressor rotors and a secondary turbine rotor; each secondary compressor rotor having compressor blades annularly and peripherally thereof; the secondary turbine rotor having blades annularly and peripherally thereof; the said secondary shaft having driving engagement with each of said secondary compressor rotors and with said secondary turbine rotor and having its axis of rotation parallel to the axis of said primary rotative shaft; the said primary and secondary compressor rotors being mounted in said structure to be in alternating succession in said compressor casing and to be in axial alignment rotatively and to provide for flow of air therethrough generally axially parallel to their axes and alternatingly through primary compressor rotors and secondary compressor rotors; the said primary and secondary turbine rotors being mounted in said structure to be in axial alignment rotatively and to provide for flow of gases therethrough generally axially parallel to their axes of rotation; an air intake to the compressor rotors, a discharge from the turbine rotors, a combustion chamber means between the compressor rotors and the turbine rotors for flow therethrough from the compressor rotors to the turbine rotors, means discharging fuel to the combustion chamber means; the blades of the primary and secondary compressor rotors being of opposite angles of incidence to the air stream, the blades of the primary and secondary turbine rotors being of opposite angles of incidence to the flow of combustion gases.

9. The means as defined in claim 8, and; the said secondary rotative shaft being further defined as having engagement axially of and with each said secondary compressor rotor and the secondary turbine rotor, and as having its axis coincidental with the axis of said secondary compressor rotors and secondary turbine rotor, and as forming a part of the structure of the bearing mounting for said primary compressor rotors and said primary turbine rotor.

10. The means as defined in claim 8, and; the said secondary compressor rotors and said secondary turbine rotor being further defined as having each a shroud affixed annularly and peripherally of the rotor, and as having each a gear formed annularly and peripherally of the shroud; the said secondary rotative shaft being further defined as having its axis of rotation located radially away from the peripheries of the gears on the shrouds of said primary and secondary compressor rotors and primary and secondary turbine rotors, and as having fixed therewith a plural number of gears each one of which is engaged with a gear on one secondary compressor rotor and as having a gear fixed therewith and engaged with the gear of the secondary turbine rotor, each gear on the secondary rotative shaft being in the plane of a gear and blades of the associated rotor.

11. The means as defined in claim 8, and: the said secondary compressor rotors and said secondary turbine rotor being further defined as having each, a shroud affixed annularly and peripherally of the rotor, as having each a gear affixed annularly and peripherally of the shroud and in the plane of the blades of the rotor; the said secondary rotative shaft being further defined as having its axis of rotation located radially away from the peripheries of the gears on the shrouds of said primary and secondary compressor rotors and primary and secondary turbine rotors, and as having fixed therewith a plural number of gears each one of which is in the plane of and engaged with a gear on one secondary compressor rotor and as having a gear fixed therewith and in the plane of and engaged with the gear of the secondary turbine rotor; the mounting of said primary and secondary compressor rotors and said primary and secondary turbine rotors being further defined as a relatively static shaft means axially of the primary and secondary compressor rotors and the primary and secondary turbine rotors, the relatively static shaft means having fixture means securing it in said casing structure, the said primary and secondary compressor rotors and the said primary and secondary turbine rotors being each rotative on said relatively static shaft means as an axis of rotation therefor.

12. The means as defined in claim 7, and: the said secondary compressor rotor and the said secondary primary turbine rotor being further defined as having each a shroud affixed annularly and peripherally of the rotor and as having each a gear formed annularly and peripherally of the shroud and in the plane of the blades of the rotor; the said secondary rotative shaft being further defined as having its axis of rotation located radially away from the peripheries of the gears on the shrouds of said primary and secondary compressor rotors and said primary and secondary turbine rotors, and as having fixed therewith a gear which is in engagement with the gear on the secondary compressor rotor and a gear which is in engagement with the gear on the secondary turbine rotor.

References Cited in the file of this patent

UNITED STATES PATENTS

| | | |
|---|---|---|
| 1,868,143 | Heinze | July 19, 1932 |
| 1,945,373 | Nolan | Jan. 30, 1934 |
| 2,472,878 | Baumann | June 14, 1949 |
| 2,575,682 | Price | Nov. 20, 1951 |
| 2,599,470 | Meyer | June 3, 1952 |
| 2,608,821 | Hunsaker | Sept. 2, 1952 |
| 2,611,532 | Ljungström | Sept. 23, 1952 |
| 2,671,315 | Rocheville | Mar. 9, 1954 |
| 2,685,429 | Auyer | Aug. 3, 1954 |
| 2,702,985 | Howell | Mar. 1, 1955 |

FOREIGN PATENTS

| | | |
|---|---|---|
| 999,320 | France | Oct. 3, 1951 |